United States Patent
Zhang et al.

(10) Patent No.: US 12,276,964 B2
(45) Date of Patent: *Apr. 15, 2025

(54) MACHINE TOOL EVALUATION METHOD, MACHINE TOOL EVALUATION SYSTEM AND MEDIUM

(71) Applicant: Aktiebolaget SKF, Gothenburg (SE)

(72) Inventors: Kaihuan Zhang, Hangzhou (CN); Gang Cheng, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 38 days.

This patent is subject to a terminal disclaimer.

(21) Appl. No.: 17/524,861

(22) Filed: Nov. 12, 2021

(65) Prior Publication Data
US 2022/0179393 A1   Jun. 9, 2022

(30) Foreign Application Priority Data
Dec. 9, 2020   (CN) .......................... 202011450152.3

(51) Int. Cl.
G05B 19/4065 (2006.01)
G05B 19/18 (2006.01)

(52) U.S. Cl.
CPC ....... *G05B 19/4065* (2013.01); *G05B 19/182* (2013.01)

(58) Field of Classification Search
CPC ... G05B 19/4065; G05B 19/182; Y02P 90/30; G06Q 10/04; G06Q 10/06393; G06Q 10/06395; G06Q 50/04
USPC ................................................. 700/108, 175
See application file for complete search history.

(56) References Cited

U.S. PATENT DOCUMENTS

| | | | |
|---|---|---|---|
| 4,580,757 A | 4/1986 | Dobhan | |
| 2015/0156954 A1 | 6/2015 | Ciulla | |
| 2020/0027040 A1 | 1/2020 | Yuan et al. | |

FOREIGN PATENT DOCUMENTS

| | | | |
|---|---|---|---|
| CN | 102478825 A | 5/2012 | |
| CN | 103235555 A | 8/2013 | |
| CN | 103869775 A | 6/2014 | |
| CN | 104423324 A | 3/2015 | |

(Continued)

*Primary Examiner* — Thomas C Lee
*Assistant Examiner* — Michael Tang
(74) *Attorney, Agent, or Firm* — GARCIA-ZAMOR INTELLECTUAL PROPERTY LAW, LLC; Ruy Garcia-Zamor

(57) ABSTRACT

A machine tool evaluation method, a machine tool evaluation system and medium are disclosed. The method includes: determining a target component of a machine tool; and for each target component: acquiring type information and attribute information of the target component; determining and acquiring, based on type information and the attribute information, target operating condition data, target state monitoring data, and target design parameter data corresponding to the target component and generating an original data set based on the target operating condition data, the target state monitoring data and the target design parameter data; preprocessing the original data set to obtain a target data set; performing feature extraction on the target data set to obtain a feature data set; and performing a multi-level evaluation on the target component, and generating an evaluation result of the target component; and generating an evaluation result of the machine tool based on the evaluation results.

9 Claims, 7 Drawing Sheets

(56) References Cited

FOREIGN PATENT DOCUMENTS

| | | | | | |
|---|---|---|---|---|---|
| CN | 105974886 | A | | 9/2016 | |
| CN | 106444631 | A | * | 2/2017 | ......... G05B 19/4086 |
| CN | 107168244 | A | | 9/2017 | |
| CN | 107530829 | A | | 1/2018 | |
| CN | 107861473 | A | | 3/2018 | |
| CN | 108196514 | A | | 6/2018 | |
| CN | 108875281 | A | | 11/2018 | |
| CN | 108921308 | A | | 11/2018 | |
| CN | 109531266 | A | | 3/2019 | |
| CN | 110023858 | A | | 7/2019 | |
| CN | 108490880 | B | | 1/2020 | |
| CN | 110806723 | A | | 2/2020 | |
| CN | 110837248 | A | * | 2/2020 | ........... G05B 19/406 |
| CN | 110961986 | A | | 4/2020 | |
| CN | 112034789 | A | * | 12/2020 | ......... G05B 19/4065 |

\* cited by examiner

MACHINE TOOL EVALUATION METHOD, MACHINE TOOL EVALUATION SYSTEM AND MEDIUM

CROSS-REFERENCE TO RELATED APPLICATIONS

This application claims priority to Chinese Patent Application no. 202011450152.3, filed Dec. 9, 2020, the contents of which is fully incorporated herein by reference.

TECHNICAL FIELD

The present invention relates to the field of machining, in particular to a machine tool evaluation method, a machine tool evaluation system and a medium.

BACKGROUND

With the wide application of machining in civil and commercial fields, higher requirements are put forward on tools for machining, especially machine tools.

At present, the evaluation of machine tools (such as health evaluation) is carried out through regular inspection and scheduled maintenance, which is completed manually in most cases. However, this kind of evaluation method is inflexible, on-site and based on experience, which leads to great error and uncertainty in the evaluation of machine tools, key components in machine tools and even machining processes. Although there are some evaluation methods based on condition monitoring, this kind of method only monitors the overall operation trend of the machine tool, only extracts a single type signal and a single type feature of the machine tool and uses a single analysis method or a single variable in the feature to realize analysis and evaluation, which is difficult to reflect the real state, performance and changes of the machine tool. It is difficult to adapt to various flexible machine tools and processing conditions, which makes the accuracy and robustness of the evaluation results poor.

Therefore, there is a need for a machine tool evaluation method that can well adapt to various flexible machine tool processing conditions and comprehensively evaluate machine tools from multiple levels on the premise of realizing machine tool evaluation, and the machine tool evaluation method can achieve high evaluation accuracy and robustness.

SUMMARY

In view of the above problems, the present invention provides a machine tool evaluation method, a machine tool evaluation system and a medium. The machine tool evaluation method provided by the present invention can well adapt to various flexible machine tool processing conditions on the basis of realizing a well evaluation of the machine tool status (e.g. health evaluation for the machine tool), and comprehensively evaluate the machine tool from multiple levels. Besides, the obtained evaluation results have high accuracy and robustness.

According to an aspect of the present disclosure, a machine tool evaluation method is provided. The machine tool evaluation method includes: determining at least one target component of a machine tool; for each target component: acquiring type information and attribute information of the target component; determining and acquiring, based on the acquired type information and attribute information, target operating condition data, target state monitoring data, and target design parameter data corresponding to the target component; generating an original data set based on the target operating condition data, the target state monitoring data and the target design parameter data; preprocessing the original data set to obtain a target data set based on a target preprocessing rule matching the type information and the attribute information of the target component; performing feature extraction on the target data set to obtain a feature data set based on a target feature extraction rule matching the type information and the attribute information of the target component; and performing a multi-level evaluation on the target component based on a multi-level evaluation rule matching the type information and the attribute information of the target component and the feature data set of the target component, and generating an evaluation result of the target component; generating an evaluation result of the machine tool based on evaluation results of the at least one target component.

In some embodiments, for each target component, generating the original data set based on the target operating condition data, target state monitoring data and target design parameter data includes: processing synchronously on the target operating condition data, target state monitoring data, and target design parameter data in multiple dimensions to obtain the original data set, wherein the multiple dimensions include a spatial dimension and a temporal dimension.

In some embodiments, for each target component, preprocessing the original data set to obtain a target data set based on the target preprocessing rule includes: determining a data division rule corresponding to the original data set based on the target operating condition data in the original data set; and performing data division on the original data set to obtain the target data set based on the data division rule.

In some embodiments, for the each target component, performing feature extraction on the target data set to obtain the feature data set based on the target feature extraction rule includes: extracting features of the target operating condition data in the target data set to obtain operating condition features of the target data set; extracting features of the target state monitoring data in the target data set to obtain state monitoring features of the target data set; extracting features of the target design parameter data in the target data set to obtain design parameter features of the target data set; and obtaining the feature data set of the target component based on the operating condition features, the state monitoring features and the design parameter features.

In some embodiments, obtaining the feature data set of the target component based on the operating condition features, the state monitoring features and the design parameter features includes: obtaining fusion feature data by performing feature fusion processing based on the operating condition features, the state monitoring features and the design parameter features, and generating the feature data set based on the fusion feature data.

In some embodiments, for the each target component, performing the multi-level evaluation on the target component based on the multi-level evaluation rule and the feature data set of the target component and generating the evaluation result of the target component includes: performing, based on the feature data set of the target component, the multi-level evaluation on the target component in terms of the operating condition, monitoring status, and design parameters to obtain evaluation data; and generating overall evaluation data of the target component based on the evaluation data.

In some embodiments, the machine tool evaluation method further includes optimizing the machine tool based on the evaluation result of the machine tool.

In some embodiments, the target component includes a cutting tool of the machine tool, wherein a step of obtaining the target data set of the cutting tool comprises: dividing the original data set based on machining processes of the cutting tool to obtain at least one sub-data set corresponding to at least one machining process; a step of obtaining the feature data set of the cutting tool comprises: extracting data features of data in the at least one sub-data set, wherein the data features comprise at least one of a cosine similarity trend, an average feature trend, or a peak feature trend; and a step of generating the evaluation result of the cutting tool comprises: evaluating the cutting tool based on the data features of the data in the at least one sub-data set to obtain process evaluation results of the cutting tool in at least one sub-process, and generating the evaluation result of the cutting tool based on the process evaluation results.

According to another aspect of the present disclosure, a machine tool evaluation system is provided. The machine tool evaluation system includes: a target component acquisition module, configured to determine a target component of a machine tool and acquire type information and attribute information of the target component; a target data determination module, configured to, for each target component, determine target operating condition data, target state monitoring data, and target design parameter data corresponding to the target component based on the type information and the attribute information; a data collection module, configured to, for each target component, acquire target operating condition data, target state monitoring data, and target design parameter data corresponding to the target component, and generate an original data set based on the target operating condition data, the target state monitoring data and the target design parameter data; a preprocessing module, configured to, for each target component, determine a target preprocessing rule corresponding to the target component based on the type information and the attribute information of the target component, and preprocess the original data set to obtain a target data set based on the target preprocessing rule; a feature extraction module, configured to, for each target component, determine a target feature extraction rule corresponding to the target component based on the type information and the attribute information of the target component, and perform feature extraction on the target data set to obtain a feature data set based on the target feature extraction rule; a component analysis evaluation module, configured to determine a multi-level evaluation rule corresponding to the target component based on the type information and the attribute information of the target component, perform a multi-level evaluation on the target component based on the multi-level evaluation rule and the feature data set of the target component, and generate an evaluation result of the target component; and an evaluation result generation module, configured to generate an evaluation result of the machine tool based on the evaluation results of the each target component.

According to another aspect of the present disclosure, a computer-readable storage medium is provided. The medium stores computer-readable instructions which, when executed by a computer, performs the method mentioned above.

BRIEF DESCRIPTION OF THE DRAWINGS

In order to more clearly illustrate the technical solutions in the embodiments of the present invention, drawings necessary for describing the embodiments will be briefly introduced below, obviously, the below described drawings are only some embodiments of the present invention. For those skilled in the art, other drawings may also be obtained based on these drawings without paying creative efforts. The following drawings are not intentionally drawn in equal scale to the actual size but focus on showing the subject matter of the present invention.

DETAILED DESCRIPTION OF THE EMBODIMENTS

Figure 1:
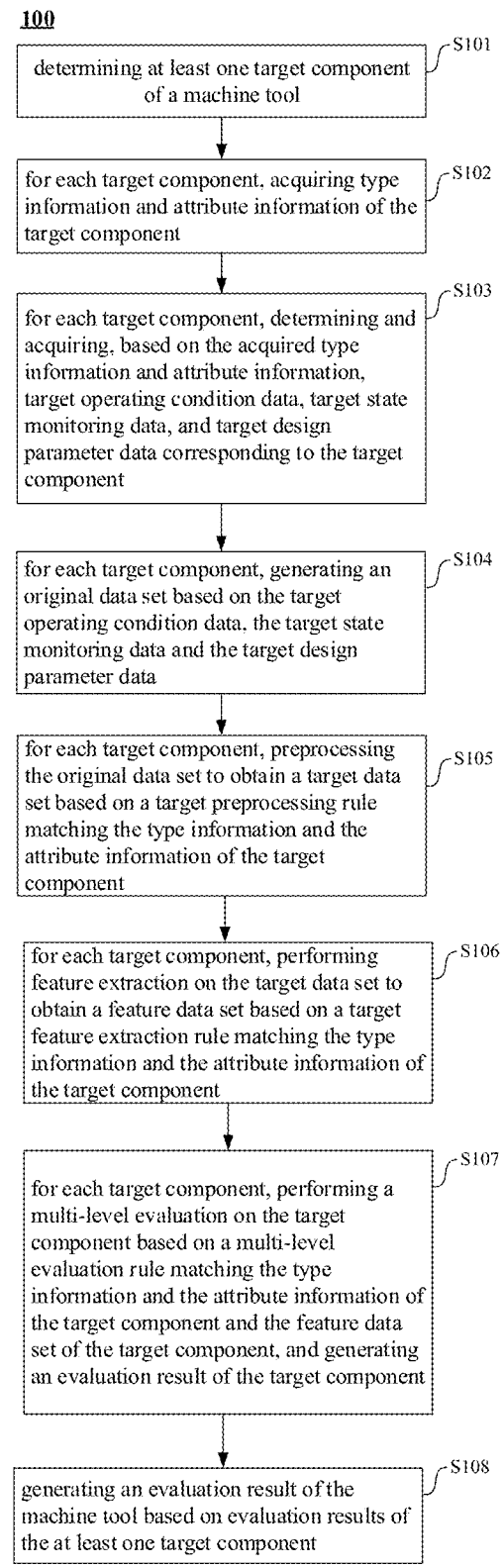
FIG. 1 shows an exemplary flowchart of a machine tool evaluation method 100 according to some embodiments of the present disclosure.

The technical solutions of the embodiments of the present invention will be clearly and completely described below in conjunction with the accompanying drawings. Obviously, the described embodiments are only part of the embodiments of the present invention, rather than all the embodiments. Based on the embodiments of the present invention, all other embodiments obtained by those of ordinary skill in the art without creative work also fall within the protection scope of the present invention.

As shown in the present specification and claims, unless the context clearly indicates exceptions, the words "a", "an", "one" and/or "the" do not specifically refer to the singular but may also include the plural. Generally speaking, the terms "including" and "comprising" only suggest that the clearly identified steps and elements are included, and these steps and elements do not constitute an exclusive list, and the method or device may also include other steps or elements.

Although the application makes various references to certain modules in the system according to the embodiments of the present application, any number of different modules may be used and run on the user terminal and/or server. The modules are merely illustrative, and different modules may be used for different aspects of the system and method.

In the present application, flowcharts are used to illustrate the operations performed by the system according to the embodiments of the present application. It should be understood that the preceding or following operations are not necessarily performed exactly in order. On the contrary, the various steps can be processed in reverse order or at the same time as required. At the same time, other operations can also be added into these processes, or a step or several steps can be removed from these processes.

It should be understood that the machine tool described in this application is intended to characterize a machine used to manufacture a machine, that is, a machine for manufacturing or a machine for tools. The machine tool may be, for example, a cutting machine tool, a forging machine tool, a woodworking machine tool, or the like. For example, the specific type of the machine tool can be selected according to the actual machining method and actual needs. The embodiments of the present disclosure are not limited by the specific type and composition of the machine tool.

At present, the evaluation of machine tools (such as health evaluation) is carried out through regular inspection and scheduled maintenance, which is completed manually in most cases. However, this kind of evaluation method is inflexible, on-site and based on experience, which leads to great error and uncertainty in the evaluation of machine tools, key components in machine tools and even machining processes. Although there are some evaluation methods based on condition monitoring, this kind of method only monitors the overall operation trend of the machine tool, only extracts a single type signal and a single type feature of the machine tool and uses a single analysis method or a single variable in the feature to realize analysis and evaluation, which is difficult to reflect the real state, performance and changes of the machine tool. It is difficult to adapt to various flexible machine tools and processing conditions, which makes the accuracy and robustness of the evaluation results poor.

Based on this, this application provides a machine tool evaluation method, a machine tool evaluation system and a medium, which can well adapt to various flexible machine tool processing conditions and comprehensively evaluate the machine tool from multiple levels on the basis of realizing the machine tool evaluation, and the machine tool evaluation method has high evaluation accuracy and robustness.

FIG. 1 shows an exemplary flowchart of a machine tool evaluation method 100 according to some embodiments of the present disclosure.

Referring to FIG. 1, firstly, in step S101, at least one target component of a machine tool is determined.

The target component is intended to characterize the core component of the machine tool that is concerned in the current machine tool evaluation. The target component can be selected based on actual needs, for example, a cutting tool may be determined as the target component, or other components of the machine tool may also be determined as the target component. The embodiments of the present disclosure are not limited by the determination method for the machine tool component and the determined specific machine tool component.

In step S102, for each target component, type information and attribute information of the target component are acquired.

The type information is intended to characterize a category of the target component, which may include, for example, a motor category, a cutting tool category, and a control component category. The embodiments of the present disclosure are not limited by the specific composition of the type information.

The attribute information is information that characterizes the attribute status of the target component. For example, the attribute information includes, for example, setting or demand information input by the user (for example, for a cutting tool, the number of continuous working hours of the cutting tool set by the user or the number of sub-processes that the cutting tool needs to execute), or it can also be condition information set based on actual use, for example, an emergency stop fault, or an over-temperature fault attribute set for a lathe motor. The embodiments of the present disclosure are not limited by the specific composition of the attribute information.

It should be noted that, after a target component is determined in step S101, step S102 and subsequent corresponding steps can be executed for this determined target component.

Thereafter, in step S103, for each target component, target operating condition data, target state monitoring data, and target design parameter data corresponding to the target component are determined and acquired based on the acquired type information and attribute information.

It should be understood that the data here (target operating condition data, target state monitoring data, and target design parameter data) may be, for example, analog data, such as directly obtained torque values; or may also be digital data, such as voltage signal value, current signal value. The embodiments of the present disclosure are not limited by the type of the data.

The target operating condition data is data which is used to reflect the overall working state of the machine tool, and the target operating condition data is associated with the target component and may be used to reflect the working state of the target component. According to the determined target components, the corresponding target operating condition data may include, for example, time stamp, program name, tool number, current machine tool coordinates, remaining machining coordinates, machine tool spindle speed, and machine tool spindle temperature. The embodiments of the present disclosure are not limited by the specific composition and type of the target operating condition data.

The target state monitoring data is monitoring data obtained by monitoring the target component or by monitoring a specific manufacturing process of the target component, and the monitoring data can directly or indirectly reflect part processes of the target component during working state or overall state of the target component. According to actual needs and determined target components, for example, the monitoring data may include machine tool spindle current, machine tool spindle load, machine tool spindle power, machine tool spindle vibration, machine tool cutting force, lubrication flow, lubrication pressure, oil pollution, etc. The embodiments of the present disclosure are not limited by the specific type and composition of the state monitoring data.

The target design parameter data is parameters in the machine tool used to characterize the setting information associated with the target component. Depending on the selected target component, it includes, for example, life setting data of the machine tool spindle, life setting data of the machine bearing, life setting data of the grease, setting data of the machine layout type, setting data of the maximum speed of the machine tool, setting stiffness and assembly data, etc. The embodiments of the present disclosure are not limited by the specific type and composition of the target design parameter data.

For example, the process of determining the target operating condition data, target state monitoring data, and target design parameter data corresponding to the target component based on the type information and attribute information can be described in more detail. For example, conventional target data (for example, including conventional operating condition data, conventional state monitoring data, and conventional design parameter data) corresponding to the type information may be obtained based on a correspondence table between the type information and conventional target data; then, additional target data (for example, including additional operating condition data, additional state monitoring data, and additional design parameter data) corresponding to the attribute information may be acquired based on a correspondence table between the attribute information and additional target data. Therefore, the target operating condition data, target state monitoring data and target design parameter data corresponding to the target component is determined.

However, it should be understood that the above only provides an exemplary method for determining the target operating condition data, target state monitoring data, and target design parameter data of the machine tool. The target operating condition data, target state monitoring data, and target design parameter data corresponding to the target component may also be determined based on the actual needs of the user, or the target operating condition data, target state monitoring data, and target design parameter data corresponding to the target component may also be configured according to the actual use scenario of the machine tool. The embodiments of the present disclosure are not limited by the specific manner of determining the target operating condition data, target state monitoring data, and target design parameter data of the target component.

For example, the process of obtaining the target operating condition data, target state monitoring data, and target design parameter data can be described in more detail. For example, the target operating condition data of the target component may be directly sampled from the control system of the machine tool or the working system of the machine tool according to a predetermined sampling frequency, or the target operating condition data may also be obtained from other sources. The embodiments of the present disclosure are not limited by the specific source of the target operating condition data and the method of obtaining it.

For example, the target state monitoring data corresponding to the target component may be acquired from sensors arranged inside or around the machine tool according to a predetermined sampling frequency or may also be acquired in other ways. The embodiments of the present disclosure are not limited by the specific source of the target state monitoring data and the method of obtaining it.

For example, the target design parameter data of the target component may be collected from the system according to a predetermined sampling frequency, or the corresponding target design parameter data may also be manually collected according to actual needs. The embodiments of the present disclosure are not limited by the specific source of the target design parameter data and the method of obtaining it.

Thereafter, in step S104, for each target component, an original data set is generated based on the target operating condition data, the target state monitoring data, and the target design parameter data.

For example, the foregoing process of generating the original data set based on the target operating condition data, the target state monitoring data, and the target design parameter data can be described in more detail. For example, the original data set may be generated directly by the acquired target operating condition data, target state monitoring data and target design parameter data. Alternatively, the target operating condition data, target state monitoring data and target design parameter data may be processed based on a preset algorithm or a processing rule, and then the original data set is obtained based on the processing result. The embodiments of the present disclosure are not limited by the specific composition mode of the original data set.

After the original data set is obtained, in step S105, for each target component, the original data set is preprocessed to obtain the target data set based on a target preprocessing rule matching the type information and attribute information of the target component.

The preprocessing process intends to characterize a process of processing data to filter out valid data currently needed, reducing and suppressing invalid data, and improving data quality. The data set required for the current machine tool evaluation obtained after preprocessing the original data set is the target data set.

The preprocessing rule is intended to characterize rule requirements that limit the specific process steps included in the preprocessing process.

The target preprocessing rule is a preprocessing rule of the target component determined based on the type information and attribute information of the target component. For example, based on the type information and attribute information of the target component, the target preprocessing rule corresponding to the target component may be directly generated through a preset algorithm or rule. Alternatively, preprocessing rules corresponding to different data in the original data set may be determined by comprehensively processing the original data set, type information, and attribute information of the target component through a preset algorithm. Alternatively, based on actual needs, a matched target pre-processing rule may be determined or selected by the user from a plurality of candidate pre-processing rules based on the type information and attribute information of the target component. The embodiment of the present disclosure is not limited by the manner of obtaining the matched target preprocessing rule and the specific content of the target preprocessing rule.

Based on the target data set, in step S106, for each target component, feature extraction is performed on the target data set to obtain a feature data set based on a target feature extraction rule matching the type information and attribute information of the target component.

The feature extraction is intended to characterize the process of extracting features of at least a part of the data in the target data set of the target component. The feature extraction rule is intended to characterize rule requirements that limit the specific process steps included in the feature extraction process.

The target feature extraction rule is intended to characterize the feature extraction rule of the target component determined based on the type information and attribute information of the target component. For example, based on the type information and attribute information of the target component, a feature extraction rule corresponding to the target component may be directly generated through a preset algorithm or rule. Alternatively, other methods may be used to determine the target feature extraction rule. The embodiments of the present disclosure are not limited by the specific determination method of the target extraction rule of the target component.

Based on actual needs, the target feature extraction rule may include, for example, using multiple different feature extraction methods for the data in the target data set to obtain the features of the data in terms of time domain, frequency domain, morphology, and fusion, etc. The embodiments of the present disclosure are not limited by the specific composition of the target feature extraction rule.

The feature data set is intended to characterize a data set obtained based on feature data obtained after feature extraction processing is performed on the data in the target data set. The embodiments of the present disclosure are not limited by the specific composition of the obtained feature data set.

After the feature data set is obtained, in step S107, for each target component, a multi-level evaluation is performed on the target component based on a multi-level evaluation rule matching the type information and attribute information of the target component and the feature data set of the target component, and an evaluation result of the target component is generated.

The multi-level evaluation rule is intended to characterize the evaluation of the target component at different levels, for example, including execution at multiple different levels such as operating condition level, condition monitoring level, and design parameter level. For example, for a cutting tool component, the multi-level evaluation may include, for example, evaluating the target component at a component sub-process performance level and an overall performance level of the component.

The multi-level evaluation rule is intended to characterize rule requirements of specific process steps of the multi-level evaluation. The multi-level evaluation rule matching the type information and attribute information of the target component intends to characterize a multi-level evaluation rule corresponding to the target component determined based on the type information and attribute information of the target component. For example, based on the type information and attribute information of the target component, a preset algorithm or rule can be used to directly generate the target multi-level evaluation rule corresponding to the target component. Alternatively, other methods may be used to determine the target multi-level evaluation rule. The embodiment of the present disclosure is not limited by the specific determination method of the target multi-level evaluation rule of the target component.

The evaluation result of the target component is intended to characterize evaluation information obtained by performing the multi-level evaluation on the target component. For example, it may be an evaluation data value, or an oscillograph or a carve graph, or a data evaluation model. The embodiments of the present disclosure are not limited by the specific composition and type of the evaluation result.

Thereafter, in step S108, an evaluation result of the machine tool is generated based on the evaluation results of the at least one target component.

The evaluation result of the machine tool is intended to characterize the evaluation information obtained by evaluating the machine tool. For example, it may be an evaluation data value, or an oscillograph or a carve graph, or a data evaluation model. The embodiments of the present disclosure are not limited by the specific composition and type of the evaluation result.

For example, the process of generating the evaluation result of the machine tool based on the evaluation results of the at least one target component can be described in more detail. For example, in the process of generating the evaluation result of the machine tool, the evaluation result of the target component may be combined with evaluation results of the machine tool at multiple other levels, so that the machine tool can be comprehensively evaluated at different levels, which is, evaluating the machine tool on multiple levels. For example, the evaluation result of the machine tool may be generated by integrating the results of the machine tool at multiple different levels such as signal evaluation, feature evaluation, process evaluation, and target component evaluation. In addition, the various evaluation processes may be combined with each other, and the evaluation methods may be flexibly selected according to the structure of the machine tool and actual needs.

However, it should be understood that the above only gives an exemplary machine tool evaluation method. Based on actual needs, other evaluation methods may also be used, or the exemplary machine tool evaluation method may be combined with the other evaluation methods. The embodiments of the present disclosure are not limited by the used specific evaluation method.

For example, when performing a health evaluation of the machine tool, evaluation parameters used to calculate, characterize, and evaluate the health degree of the machine tool may include, for example, an average value, a weighted average value, a median value, a maximum value, a minimum value, area and even compound index that can reflect the health degree of the machine tool. The embodiments of the present disclosure are not limited by the types of evaluation parameters selected in the evaluation process.

Based on the foregoing, in the present application, by determining at least one target component of the machine tool, determining and acquiring the target operating condition data, target state monitoring data, and target design parameter data of the target component based on the type information and attribute information of the target component, performing preprocessing and feature extraction on the various data to obtain a feature data set, and further performing multi-level evaluation on the target component based on the feature data set, the evaluation result of the target component is generated, and the evaluation result of the machine tool is generated accordingly. In comparison, in technical solutions of the related art, a single type of signal is collected, and a single type of analysis and evaluation is performed. On one hand, the present application collects various types of data related to the target components in the machine tool, and comprehensively considers the overall working status, partial processes and component working status and parameter design of each target component of the machine tool, making it more comprehensive and accurate in reflecting the status of the target component, so as to better reflecting the status of the machine tool; on the other hand, the evaluation of the target component and the machine tool can be achieved by a multi-level evaluation method, so that multiple different analysis methods can be used on the basis of obtaining multiple types, and the performance state of the machine tool may be evaluated from multiple terms and aspects, then the evaluation result can well reflect the actual performance state and change law of the machine tool, thereby providing more accurate and timely evaluation results of the machine tool. It is conducive to monitoring, feedback and optimization in the following steps based on the evaluation results.

In some embodiments, in step S104, for each target component, the process of generating the original data set based on the target operating condition data, target state monitoring data, and target design parameter data can be described in more detail. For example, the target operating condition data, target state monitoring data, and target design parameter data may be processed synchronously in multiple dimensions to obtain the original data set.

For example, the multiple dimensions include a spatial dimension and a temporal dimension. Specifically, for example, when the target operating condition data, target state monitoring data, and target design parameter data are acquired through periodic sampling, the acquired target operating condition data, target state monitoring data, and target design parameter data, for example, may have different time axis starting points and different durations since the selected sampling frequency is different and the start time of the sampling process is different. It is also possible that part of the data is missing or significantly inaccurate due to an abnormality in the sampling process, such that the data in the acquired original data set has incomplete data content in the spatial dimension and has discontinuous data in the temporal dimension and the data is inconsistent in timing. Thus, for example, the data may be processed in the temporal dimension based on a standard clock source to achieve synchronization and alignment between multi-source data. Besides, various algorithms such as an interpolation algorithm and a conversion algorithm may also be used to modify and completion data values (that is, the processing in spatial dimension) to obtain a complete original data set for machine tool monitoring and evaluation.

Based on this, on the basis of obtaining the target operating condition data, target state monitoring data and target design parameter data, processing the multi-source data synchronously in multiple dimensions (such as spatial dimension and temporal dimension), it possible to realize the synchronization and alignment of the multi-source data, and this is conducive to correcting the problem of missing data content, thereby further improving the quality of the obtained data in the original data set, and facilitating subsequent processing and evaluation based on the data. At the same time, the reliability and accuracy of the machine tool evaluation method are improved.

Figure 2:
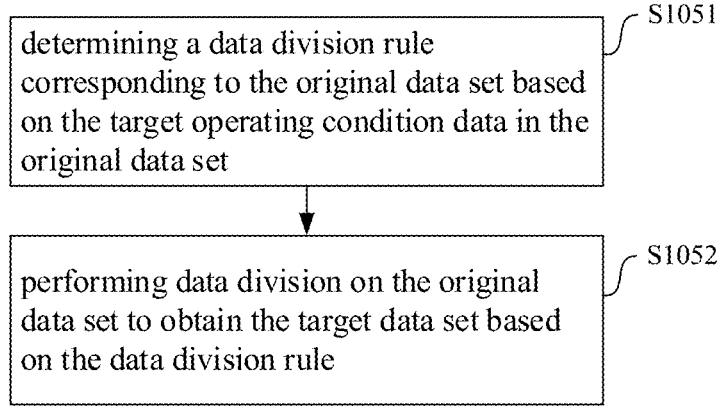
FIG. 2 shows an exemplary flowchart of a process S105 of preprocessing an original data set to obtain a target data set according to some embodiments of the present disclosure.

In some embodiments, for example, the foregoing step S105 of preprocessing the original data set to obtain the target data set can be described in more detail. FIG. 2 shows an exemplary flow chart of the process S105 of preprocessing the original data set to obtain the target data set according to some embodiments of the present disclosure.

Referring to FIG. 2, firstly, in step S1051, a data division rule corresponding to the original data set is determined based on the target operating condition data in the original data set.

The data division rule is intended to characterize a rule for data division and grouping of data in the original data set. The data division rule may be directly determined based on the target operating condition data or may also be determined by processing the target operating condition data with a preset algorithm. The present disclosure is not limited by the specific determination method of the data division rule.

Based on actual needs, the data division rule may be, for example, a division based on cutting tool, a division based on processing mode, and a division based on machining process. The embodiments of the present disclosure are not limited by the specific content of the data division rule.

Thereafter, in step S1052, data division is performed on the original data set to obtain the target data set based on the data division rule.

The data division intends to characterize an operation of grouping or dividing the data in the target data set. Specifically, for example, multiple data in the target data set may be divided into a same group, or the data in the data set may be intercepted first, and then the intercepted data may be grouped. The embodiments of the present disclosure are not limited by the specific execution manner of the data division process.

It should be understood that, based on actual needs, for example, only one target data set may be generated, or multiple target data sets may also be generated (for example, respectively corresponding to multiple different technical processes or different sub-components of the target component). The embodiments of the present disclosure are not limited by the specific number of target data sets obtained.

For example, the current cutting machine tool component performs the "turning" technical process, and the technical process includes: feed-turning-retreat. The target operating condition data (such as time stamp data and working process data), the torque data of the machine tool spindle (state monitoring data) and the spindle life data of the machine tool (target design parameter data) of the cutting tool component are currently acquired for the full process. When only the turning stage needs to be evaluated, for example, the different working stages (feed stage, turning stage, and retract stage) may be determined according to the working process data in the target operating condition data, and the data may be grouped according to the working stages, the spindle life data corresponding to the turning stage, the target operating condition data corresponding to the turning stage, and the spindle torque data corresponding to the turning stage may be extracted, and therefore a target data set is generated.

Based on the above, the data division rule is determined based on the target operating condition data in the original data set, and the data in the data set is divided. Based on actual needs and specific evaluation objects, the data set associated with the current specific evaluation objects (such as a specific process of the target component, a specific sub-component of the target component, etc.) can be obtained, so as to obtain a data set with the minimum granularity required for subsequent evaluation. This is conducive to improving the speed and efficiency of subsequent processing and evaluation; at the same time, based on the data division, the extracted multi-source data is organically combined based on a preset rule to obtain multi-level, multi dimension data corresponding to the specific evaluation object. This is beneficial to the subsequent accurate and dynamic evaluation of the specific evaluation object based on the data; therefore the reliable and high-precision evaluation of the machine tool can be achieved.

In some embodiments, for example, the data division rule of the original data set may be determined jointly based on the target operating condition data, target state monitoring data, and target design parameter data, or the data division rule of the original data set may also be determined based on part of the data in the target operating condition data, target state monitoring data, and the design parameter data.

In some embodiments, in the above-mentioned preprocessing process, before or after the data division process, for example, it may further include: a data deduplication process, a data denoising process, a data encoding process, and a data filtering process.

The data deduplication process intends to delete duplicate data in the target data set. For example, duplicate data may be retrieved and deleted based on data such as timestamp and process number.

The data denoising process intends to remove abnormal values in the data and realize the optimization of the data. For example, distance-based detection, statistics-based detection, distribution-based outlier detection, density clustering detection, boxplot detection, and other methods may be used to denoised the original signal so as to removing outliers in the data.

The data encoding intends to characterize a process of processing the data format based on a preset rule to obtain uniformly encoded data. For example, the required target data format may be determined according to analysis, modeling, and evaluation, and the data may be encoded correspondingly based on the target data format to facilitate subsequent processing.

The data filtering intends to identify and eliminate noise in the data, and improve the contrast ratio of effective feature information in the data. For example, a weighted average filter, a median filter, a Gaussian filter, a Wiener filter, and other methods may be used to implement the data filtering process.

It should be understood that the foregoing only provides an exemplary pretreatment process. According to actual needs, other preprocessing methods may also be selected.

Figure 3:
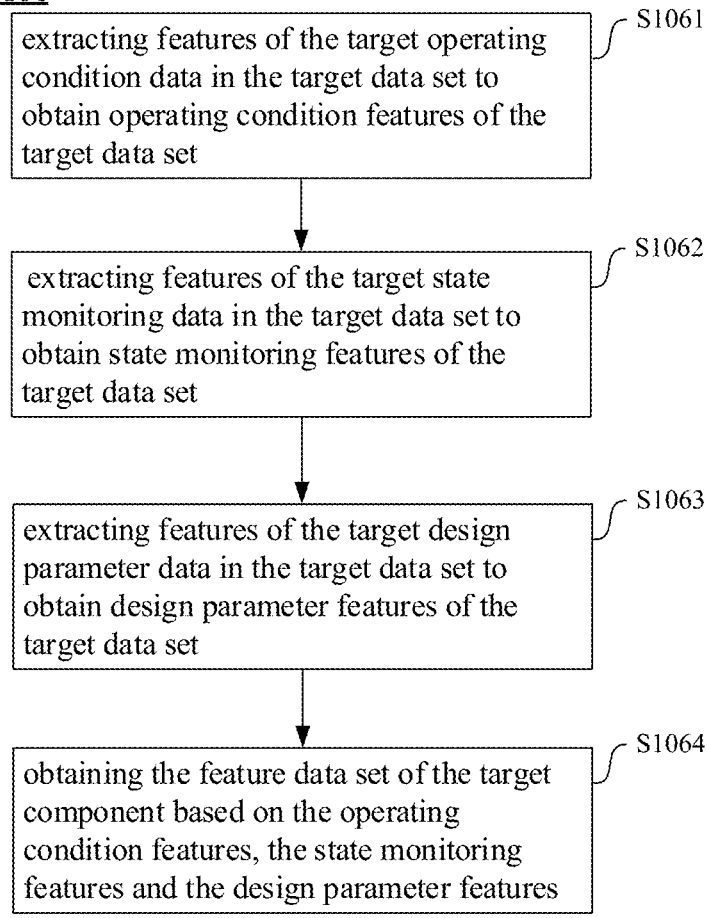
FIG. 3 shows an exemplary flowchart of a process S106 of obtaining a feature data set of a machine tool according to some embodiments of the present disclosure.

In some embodiments, for each target component, the process S106 of performing feature extraction on the target data set based on a target feature extraction rule to obtain the feature data set may be described in more detail, for example. FIG. 3 shows an exemplary flowchart of the process S106 of obtaining the feature data set of the machine tool according to some embodiments of the present disclosure.

Referring to FIG. 3, firstly, in step S1061, features of the target operating condition data in the target data set are extracted to obtain operating condition features of the target data set. Thereafter, in step S1062, features of the target state monitoring data in the target data set are extracted to obtain state monitoring features of the target data set. Thereafter, further, in step S1063, features of the target design parameter data in the target data set are extracted to obtain design parameter features of the target data set.

It should be understood that during performing the feature extraction on the target operating condition data, target state monitoring data, and target design parameter data, for example, different types of data features may be extracted by different extracting method according to types and characteristics of the specific data included in the target operating condition data, target state monitoring data, and target design parameter data. The embodiments of the present disclosure are not limited by the specific manner of feature extraction.

It should be understood that, in steps S1061, S1062, and S1063, for example, a same feature extraction method may be used, or different feature extraction methods may be used. The embodiments of the present disclosure are not limited by the relationship of the feature extraction methods used in steps S1061, S1062, and S1063.

It should be understood that the above steps S1061, S1062, S1063 may be executed sequentially, or they may also be executed in reverse order or in parallel. The embodiment of the present disclosure is not limited by the execution order of the above steps S1061, S1062, S1063.

The following will exemplarily show the feature extraction method used in the feature extraction performed on target operating condition data, target state monitoring data, and target design parameter data. For example, based on actual needs, data extraction of the target data set may include, for example, time domain feature extraction, frequency feature extraction, time-frequency domain feature extraction, and waveform feature extraction.

The time-domain feature extraction refers to the extraction of time-domain features of data (for example, collected signals), which includes but is not limited to mean, variance, standard deviation, maximum value, minimum value, root mean square, peak-to-peak value, skewness, kurtosis, waveform index, impulse index, margin index, etc.

The frequency feature extraction refers to the extraction of frequency features of data, which includes but is not limited to mean square frequency, frequency variance, frequency band energy, etc.

The time-frequency domain feature extraction refers to the extraction of the time-frequency domain features of data, which includes but is not limited to the frequency band energy or time domain characteristics of the signal after wavelet decomposition or empirical mode decomposition.

The waveform feature extraction refers to the extraction of waveform features of data. For example, when the data is a collected signal, the waveform features include, but are not limited to, an area enclosed by the signal waveform, maximum/minimum derivative, rising edge, falling edge features, etc.

Finally, in step S1064, a feature data set of the target component is obtained based on the operating condition features, condition monitoring features, and design parameter features.

For example, the operating condition features, condition monitoring features, and design parameter features may be directly used to form a feature data set. Alternatively, the operating condition features, condition monitoring features, and design parameter features may be further processed (such as feature fusion processing), and the feature data set is obtained based on the processing result. The embodiments of the present disclosure are not limited by the specific generation method and content of the feature data set.

Based on the above, in this application, based on actual needs, a variety of feature extraction methods may be used to extract operating condition features, condition monitoring features, and design parameter features from the target data set, and the feature data set of the machine tool is obtained based on the operating condition features, condition monitoring features, and design parameter features. Thus, the feature data set obtained can comprehensively reflect the characteristics of the target component in terms of operating condition, status monitoring, and design parameters. Compared with the technical solution that only extracts a single feature and executes only a single feature extraction method, the feature data set obtained in the present application can more comprehensively reflect characteristics of the target component in multi-level, multi-dimension, and multi-term, which is conducive to subsequent accurate and high-precision evaluation based on the feature data set and is conducive to improving the accuracy of evaluation results of the machine tool.

In some embodiments, obtaining the feature data set of the target component based on the operating condition features, condition monitoring features, and design parameter features includes: obtaining a fusion feature data by a feature fusion processing based on the operating condition features, condition monitoring features, and design parameter features, and generating the feature data set based on the fusion feature data.

The data fusion processing intends to characterize the process of fusing multiple features to obtain fused feature data based on a preset fusion rule.

For example, a deep fusion of feature layers may be used, such as a distance-based algorithm, a similarity algorithm, a weighted average algorithm, a principal component analysis algorithm, etc., to reduce dimensionality and fuse the extracted original features (such as operating condition features, condition monitoring features, design parameters), and the fusion feature that integrates the original feature information from the feature depth direction is obtained.

For example, the working state layer width fusion method may also be used, that is, for the original features corresponding to different sub-processes of the same overall process, the features may be integrated to obtain the fusion feature reflecting the overall process, and further integration with actual business scenarios for following evaluation step.

It should be understood that only exemplary fusion methods are given above, and different data fusion methods may be used according to actual needs, for example, a signal layer width fusion method may also be used. The embodiments of the present disclosure are not limited by the specific manner of the data fusion.

Based on the above, by performing feature fusion after feature extraction, the extracted features can be further correlated in different dimensions, so that the overall and comprehensive feature information can be obtained based on the local and scattered features, which is beneficial to better reflecting the characteristics of all aspects of the target component, thereby facilitating subsequent evaluation of the target component at multiple levels, and improving the accuracy of the machine tool evaluation.

In some embodiments, for each target component, performing multi-level evaluation on the target component based on a multi-level evaluation rule and the feature data set of the target component, and generating the evaluation result of the target component includes: first, performing, based on feature the data set of the target component, multi-level evaluation on the target component in terms of operating condition, monitoring status, and design parameters to obtain evaluation data; then, generating, based on the evaluation data, overall evaluation data of the target component.

The evaluation of the target component in terms of operating condition is an evaluation of operating condition, which intends to evaluate the current working state of the target component. The evaluation of the target component in terms of monitoring status is an evaluation of monitoring status, which intends to evaluate the performance of the target component in a specific machining process or the performance of the core components inside the machine tool. The evaluation of the target component in terms of design parameters is an evaluation of design parameters, which intends to evaluate the design performance of the target component.

For example, in the operating condition evaluation, monitoring status evaluation, and design parameters evaluation, the target component may be evaluated in multiple levels from top to bottom, and multi-level evaluation data may be generated. The embodiments of the present disclosure are not limited by the specific execution process of the operating condition evaluation, monitoring status evaluation, and design parameters evaluation.

Based on the above, through the evaluation of the target component in terms of operating condition, monitoring status, and design parameters, the evaluation data of the target component is obtained in terms of overall operating condition level, partial core subcomponent/technology process level, and design parameters respectively, and then overall evaluation data is obtained based on the evaluation data, which makes it possible to realize the multi-level and multi-dimension evaluation of the target component from top to bottom, from the whole to the part, from the whole machine to the components, and from the overall process to the sub-process, so as to reflect characteristics and status of the machine tool more comprehensively, and realize an accurate and flexible evaluation mechanism for the machine tool. It is also conducive to the later optimization process based on the evaluation results.

In some embodiments, the machine tool evaluation method further includes: optimizing the machine tool based on the evaluation result of the machine tool.

For example, if the evaluation is an evaluation of the health degree of a machine tool, for example, the user may make corresponding decisions and take measures to locate faults, eliminate faults, solve problems, schedule maintenance, and optimize processes and design based on the health degree data set obtained by the evaluation.

Preferably, some typical optimization procedures include, but are not limited to, predictive health management, signal calibration and optimization, manufacturing process evaluation and optimization, working status monitoring and improvement, and design parameters optimization. According to actual needs, other optimizations may also be performed. The embodiments of the present disclosure are not limited by the specific optimization process performed.

Based on the above, after the evaluation of the machine tool is implemented based on the aforementioned method, based on the evaluation result, the corresponding decision is made and measures are taken to locate the fault, eliminate the fault, solve the problem, arrange maintenance, and optimize the process and design, so as to achieve effectively optimization of the machine tool, thereby the performance and reliability of the machine tool is improved.

In some embodiments, the target component includes, for example, a cutting tool of the machine tool, and the aforementioned machine tool evaluation method may be described in more detail.

The step of obtaining the target data set of the cutting tool includes, for example, dividing the original data set based on the manufacturing process of the cutting tool to obtain at least one sub-data set corresponding to at least one manufacturing process.

The step of obtaining the feature data set of the cutting tool includes: extracting data features of the data in the at least one sub-data set, and the data features include at least one of a cosine similarity trend, an average characteristic trend, and a peak characteristic trend.

The step of generating the evaluation result of the cutting tool includes: evaluating the cutting tool based on the data features of the data in the at least one sub-data set to obtain process evaluation results of the cutting tool in the at least one sub-process, and generating a cutting tool evaluation result based on the process evaluation results.

Based on the above, when the target component is a cutting tool component, based on the type information (cutting tool) and attribute information (total machining process) of the cutting tool component, the original data set of the tool is divided based on the machining process to obtain sub-data set corresponding to machining process. The data features of the sub-data set is extracted in the subsequent steps, and the cutting tool evaluation result is generated based on the process evaluation result of the cutting tool in at least one sub-process, so that for the cutting tool as a specific target component of the machine tool, the rules in each process of evaluation can be flexibly set based on its type and attributes, the evaluation of the cutting tool can be achieved well, therefore, the accuracy of the evaluation result is improved and the evaluation result has good robustness.

Figure 4:
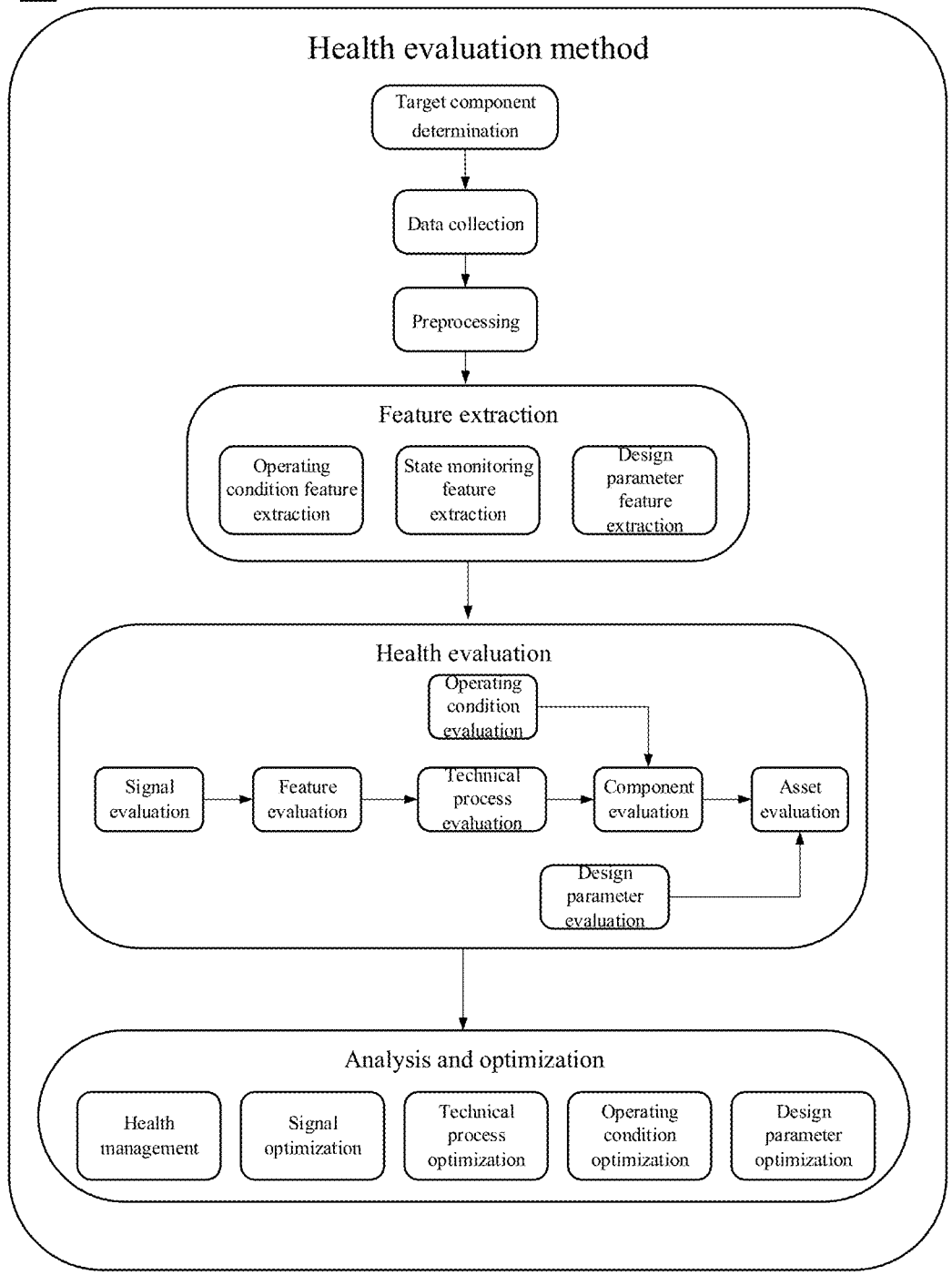
FIG. 4 shows an exemplary flowchart of a machine tool health evaluation method 200 according to some embodiments of the present disclosure.

Next, the above method will be explained in more detail in combination with specific application scenarios. FIG. 4 shows an exemplary flowchart of a machine tool health evaluation method 200 according to some embodiments of the present disclosure.

The machine tool health evaluation method 200 is mainly based on, for example, the performance of a machine tool (here, a drilling machine) during the drilling process of a six-hole part for an engine, so as to monitor, evaluate and optimize the machining process, key components and the machine tool itself. And, the determined target component includes, for example, a cutting tool of the machine tool.

First, for example, the type information and attribute information of the cutting tool of the machine tool is obtained. For example, the type information of the cutting tool of the machine tool is: a cutting tool, and the attribute information is: performing the drilling process of the six-hole part.

Figure 5:
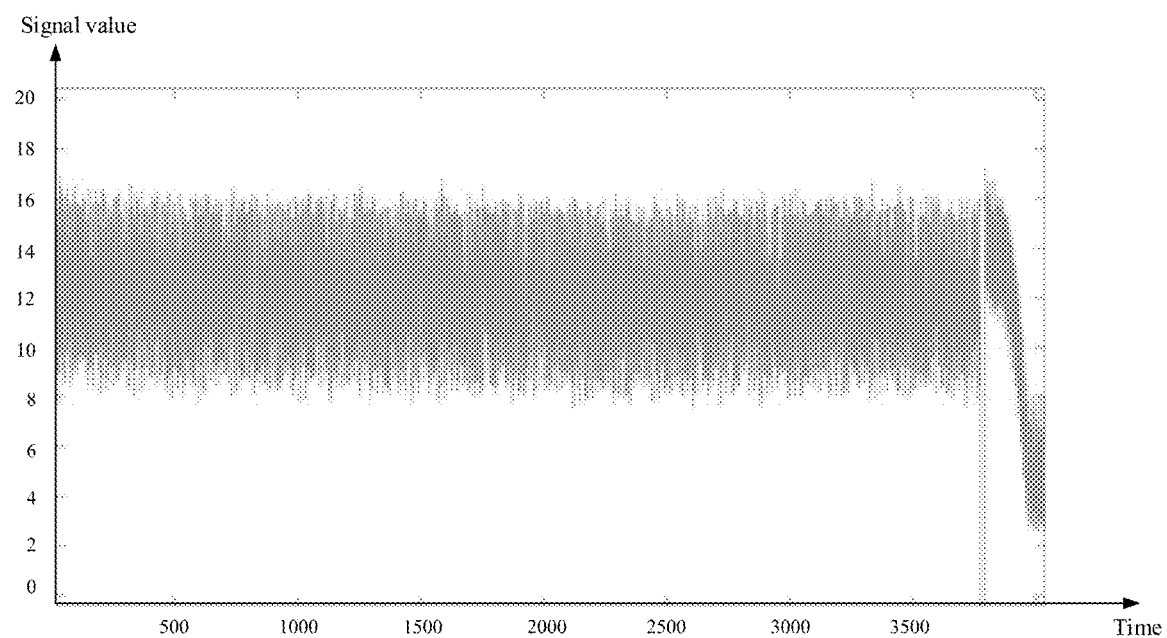
FIG. 5 shows a partial schematic diagram of a torque signal collected according to the machine tool health evaluation method 200.

Based on the type information and attribute information, for example, target operating condition data, target state monitoring data, and target design parameter data corresponding to the target component can be determined and acquired. Specifically, in this application scenario, the collected target state monitoring data includes, for example, a torque signal collected on the spindle of the machine tool at a sampling frequency of 100 Hz (the change in the torque signal can reflect the operation of the spindle of the machine tool, and is related to the wear of the machine tool). FIG. 5 shows a partial schematic diagram of a torque signal collected according to the machine tool health evaluation method 200.

Thereafter, for example, in the preprocessing process, a preprocessing operation is performed on the collected multiple raw data based on a target preprocessing rule matching the type information and attribute information of the target component. For example, the preprocessing process includes, the aforementioned data division process, for example, the original data is divided based on the machining process. Specifically, based on the features of the drilling process of the six-hole part, the total technical process of the six-hole part is composed of six drilling sub-processes. For example, the obtained data is divided according to the different drilling sub-processes to which it belongs. Therefore, different processing and evaluation can be carried out for different processing features of different sub-processes in the subsequent steps.

And the preprocessing process, for example, also includes other preprocessing operations as described above, such as data deduplication, data noise reduction, data encoding, and data filtering. Based on the type and characteristics of the data, in these embodiments, for example, algorithms based on statistics and box plots may be mainly used in data noise reduction, and median filtering may be mainly used in data filtering.

After that, after preprocessing, feature extraction is performed on the preprocessed preferred data in the feature extraction process. Based on this specific application scenario, the feature extraction here is, for example, a time-domain feature extraction. According to the signal characteristics, the mean, standard deviation, maximum value, root mean square value and waveform index are selected as a feature to be extracted in a single feature extraction process.

Figure 6:
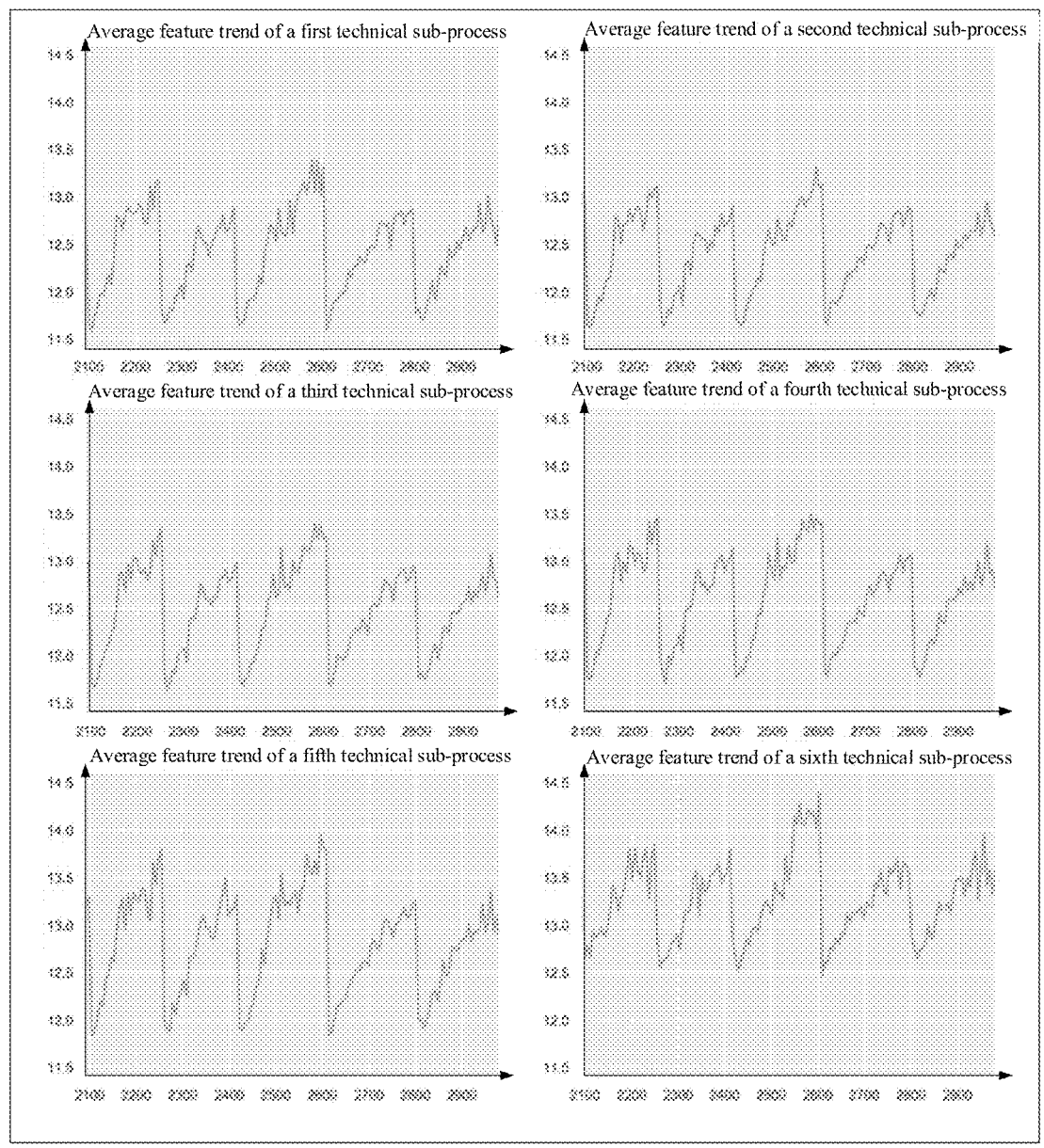
FIG. 6 shows an average feature trend diagram obtained by performing feature extraction on preprocessed data according to the machine tool health evaluation method 200.

FIG. 6 shows an average feature trend diagram obtained by performing feature extraction on preprocessed data according to the machine tool health evaluation method 200. Among them, based on the six sub-process data sets obtained in the preprocessing (corresponding to the manufacturing process of the six holes), feature extraction is performed on the data of the six data sets respectively to obtain the average feature trend graphs of the six sub-processes as shown in FIG. 6, in which the horizontal axis of each trend graph of the sub-process represents time, and the vertical axis, for example, may represent specific feature values. For example, the average feature trend graphs can be directly used for subsequent evaluation steps.

Figure 7:
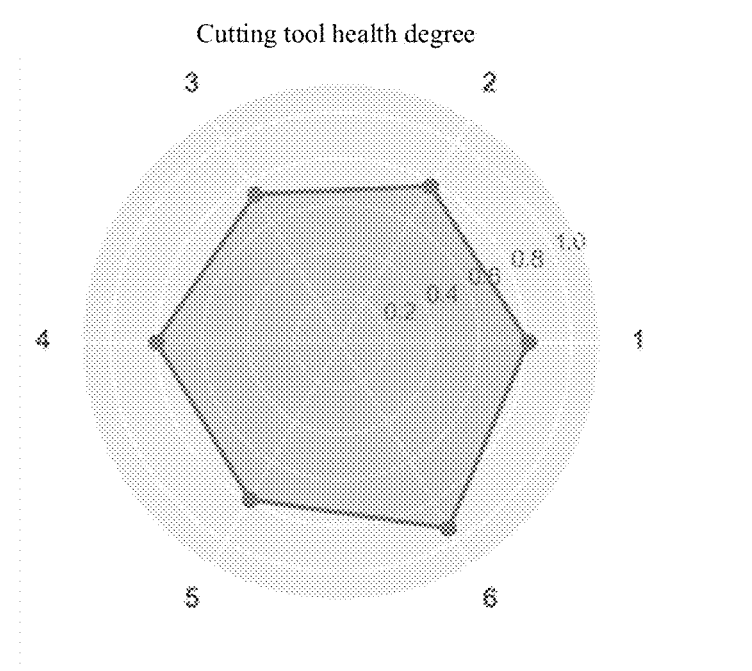
FIG. 7 shows a schematic diagram of a cutting tool health degree according to some embodiments of the present disclosure.

After the feature extraction is performed, the health evaluation of the target component is performed based on the extracted features. And the evaluation result of the component may be generated based on the evaluation result of the component at the technical process level. Specifically, for example, based on the average feature trend graphs of the six sub-processes shown in FIG. 6 above, the health degree of each sub-process is calculated, and the health degree of the six sub-processes is used as the evaluation result of the process. Thereafter, for example, based on the evaluation result of the process, a radar chart as shown in FIG. 7 is drawn, in which the 6 boundary points of the radar chart are used to characterize the process health degree values of the six sub-processes (for example, 1 is best, 0 is the lowest), the area enclosed by the line of the six boundary points, for example, represents the component health degree of the cutting tool of the machine tool. By analogy, for example, the total health degree of the machine tool can be generated based on the health degree of the multiple target components of the machine tool.

Specifically, the process of generating the evaluation result of the machine tool may be described in more detail. For example, the process of generating the evaluation result of the machine tool may be performed in different levels of signal evaluation (characterizing that the evaluation is performed directly based on collected data), feature evaluation (evaluation based on feature data after feature extraction), technical process evaluation (evaluation of specific technical process), component evaluation (evaluation of target components) and asset evaluation (that is, evaluation of the target object, for example, the health degree of the machine tool in this application scenario). And the final machine tool evaluation result may be generated based on the evaluation results of the above levels. And different levels of evaluation can be related to each other. For example, the component evaluation result can be comprehensively generated based on the operating condition evaluation result and the technical process evaluation result, and for example, the asset evaluation result can be comprehensively generated based on the component evaluation result and the design parameter evaluation result. The aforementioned multiple evaluations at multiple levels may have, for example, the execution flow and execution sequence shown in FIG. 4. However, the embodiments of the present disclosure are not limited to this, and other execution orders may also be adopted.

Figure 8:
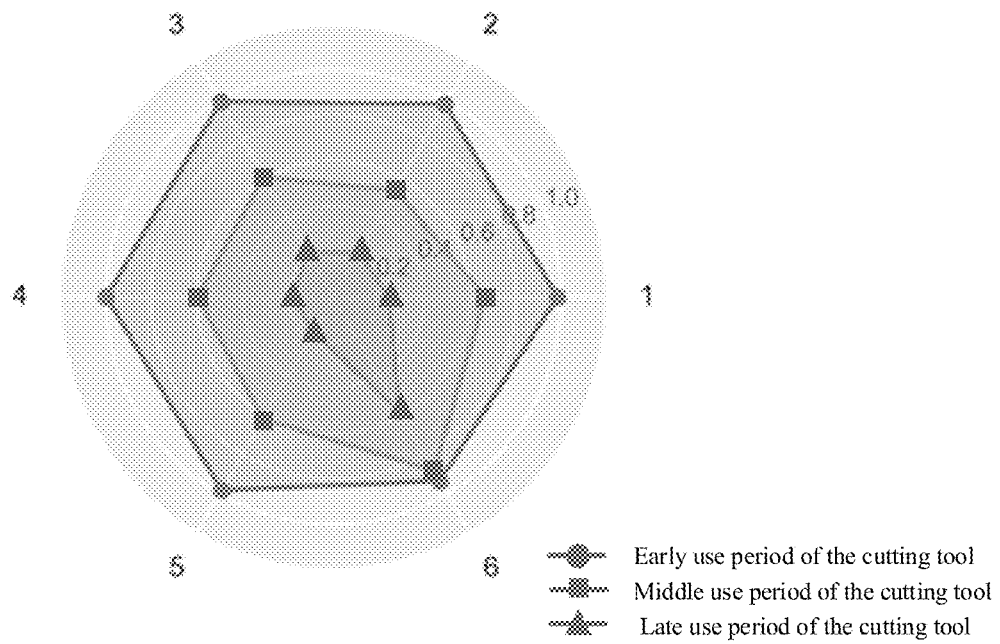
FIG. 8 shows a schematic diagram of the cutting tool health degree in different periods of use according to some embodiments of the present disclosure.

In addition, based on the evaluation results, an efficient optimization and maintenance process can also be realized. Specifically, FIG. 8 shows a schematic diagram of the health degree of the cutting tool in different periods of use according to embodiments of the present disclosure. Referring to FIG. 8, for example, a radar chart of the health degree of the parts of the cutting tool can be drawn at different stages of the machine tool including the early, middle, and late periods of use. Among them, the early use of the cutting tool is intended to characterize that the tool is in an unworn or slightly worn state, the middle use of the cutting tool indicates that the tool is in a state of moderate wear, and the late use of the cutting tool indicates that the cutting tool is in a state of large-area wear. By evaluating the health degree of the cutting tool under different usage conditions, it is possible to accurately and intuitively indicate the overall health degree change of the cutting tool during the entire use periods, which is conducive to the subsequent improvement and maintenance of the machine tool based on the evaluation results, for example, performing the operation of changing the cutting tool in time, or give an alarm when the health degree cutting tool is lower than a preset value, etc.

Figure 9:
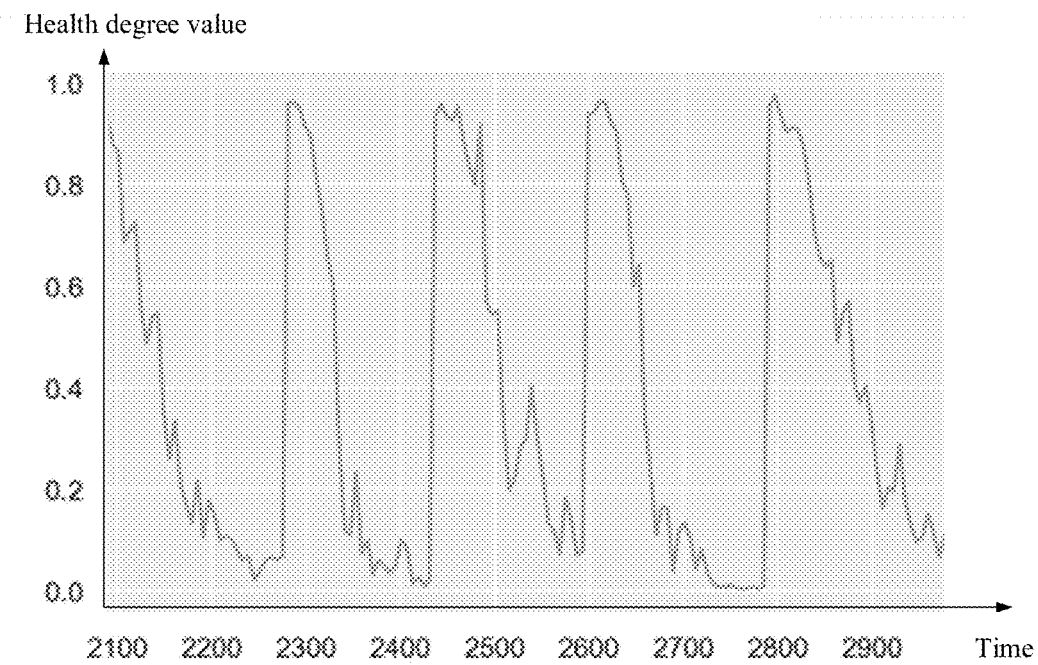
FIG. 9 shows a tool health degree trend graph according to some embodiments of the present disclosure.

For example, based on the health degree evaluation of the aforementioned cutting tool component the tool can also be drawn. FIG. 9 shows a tool health degree trend graph according to some embodiments of the present disclosure. The horizontal axis of the graph of FIG. 9 represents the time t, and the vertical axis of it represents the calculated health degree value of the cutting tool (for example, 1 is the best, 0 is the lowest), and the drop in the waveform represents the health degree of the cutting tool decline (such as being worn) as the cutting tool being used. In this case, the almost vertical rising waveform characterizes the operation of replacing the cutting tool with a new one. After the cutting tool is replaced, the measured health value of the new cutting tool returns to the best state (it can be seen from the figure that it is close to 1), and then the value decreases as the continuously worn of use. Based on the waveform diagram, the change of the health degree of the cutting tool over time can be shown intuitively, which is beneficial to the subsequent adjustment of the cutting tool replacement node.

Based on the above, by providing the machine tool evaluation method based on condition monitoring, multi-signal, multi-operating condition and multi-dimensional fusion of original signal data can be realized. More comprehensive and hierarchical methods and indications can be obtained to reflect the status of the machine tool, and used to evaluate the actual performance status and change law of each level of the machine tool, so as to provide more accurate and timely warnings, alarms, feedback and optimization strategies. This can gradually solve the processing problems caused by the parts, operating conditions and processing processes, and ultimately reduce processing costs, improve quality, and improve efficiency.

And the use of this method can monitor, evaluate and improve machine tools in a continuous closed loop, which can enhance the performance, service capabilities and solution capabilities of related products. In addition, it can also process and module the acquired data based on big data or machine learning, so as to realize the evaluation and optimization of the machine tool in a digital and intelligent way.

Figure 10:
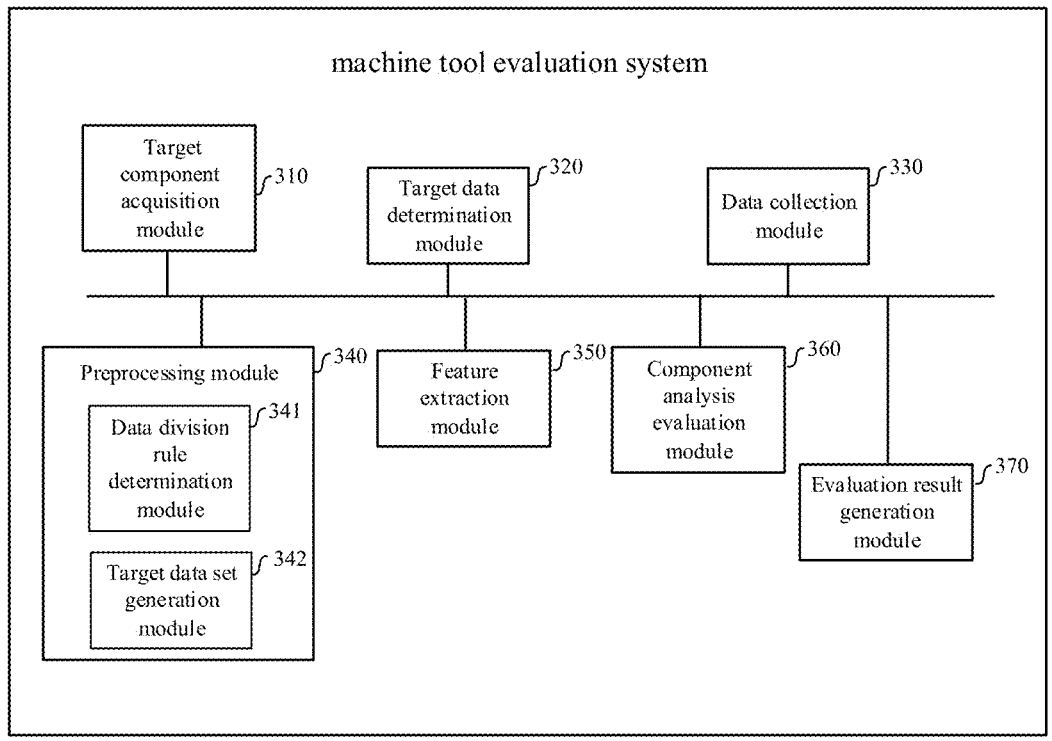
FIG. 10 shows a schematic block diagram of a machine tool evaluation system 300 according to some embodiments of the present disclosure.

According to another aspect of the present disclosure, a machine tool evaluation system is also proposed. FIG. 10 shows a schematic block diagram of a machine tool evaluation system 300 according to some embodiments of the present disclosure.

Referring to FIG. 10, the machine tool evaluation system 300 includes a target component acquisition module 310, a target data determination module 320, a data collection module 330, a preprocessing module 340, a feature extraction module 350, a component analysis evaluation module 360, and an evaluation result generation module 370.

In addition, the target component acquisition module 310 is configured to perform the processes of step S101 and step S102 in the machine tool evaluation method of FIG. 1 which includes determining a target component of the machine tool, and acquiring the type information and attribute information of the target component.

The target data determination module 320 is configured to perform the process of step S103 in the machine tool evaluation method of FIG. 1 which includes, for each target component, determining the target operating condition data, target state monitoring data and target design parameter data based on the type information and attribute information of the target component.

The data collection module 330 is configured to perform the process of step S104 in the machine tool evaluation method of FIG. 1 which includes, for each target component, obtaining the target operating condition data, the target state monitoring data and the target design parameter data corresponding to the target component and generating an original data set based on the target operating condition data, target state monitoring data, and target design parameter data.

The preprocessing module 340 is configured to execute the process of step S105 in the machine tool evaluation method of FIG. 1 which includes preprocessing the original data set based on the target preprocessing rule to obtain the target data set.

The feature extraction module 350 is configured to perform the process of step S106 in the machine tool evaluation method of FIG. 1 which includes performing feature extraction on the target data set based on the target feature extraction rule to obtain a feature data set.

The component analysis evaluation module 360 is configured to perform the process of step S107 in the machine tool evaluation method of FIG. 1 which includes determining a multi-level evaluation rule corresponding to the target component based on the type information and the attribute information of the target component, performing a multi-level evaluation on the target component based on the multi-level evaluation rule and the feature data set of the target component, and generating an evaluation result of the target component.

The evaluation result generation module 370 is configured to execute the process of step S108 in the machine tool evaluation method of FIG. 1 which includes generating an evaluation result of the machine tool based on the evaluation result of each target component.

Based on the foregoing, in the present application, by determining at least one target component of the machine tool, determining and acquiring the target operating condition data, target state monitoring data, and target design parameter data of the target component based on the type information and attribute information of the target component, performing preprocessing and feature extraction on the various data to obtain a feature data set, and further performing multi-level evaluation on the target component based on the feature data set, the evaluation result of the target component is generated, and the evaluation result of the machine tool is generated accordingly. Compared with the technical solution of collecting a single type of signal, performing a single type of analysis and evaluation in the prior art: on one hand, the present application collects various types of data related to the target components in the machine tool, and comprehensively considers the overall working status, partial processes and component working status and parameter design of each target component of the machine tool, making it more comprehensive and accurate in reflecting the status of the target component, so as to better reflecting the status of the machine tool; on the other hand, the evaluation of the target component and the machine tool can be achieved by a multi-level evaluation method, so that multiple different analysis methods can be used on the basis of obtaining multiple types, and the performance state of the machine tool may be evaluated from multiple terms and aspects, then the evaluation result can well reflect the actual performance state and change law of the machine tool, thereby providing more accurate and timely evaluation results of the machine tool. It is conducive to monitoring, feedback and optimization in the following steps based on the evaluation results.

In some embodiments, the preprocessing module 340 further includes a data division rule determination module 341 and a target data set generation module 342.

The data division rule determination module 341 is configured to execute the process of step S1051 in FIG. 2 which includes determining a data division rule corresponding to the original data set based on the target operating condition data in the original data set.

The data division rule is intended to characterize a rule for data division and grouping of data in the original data set. The present disclosure is not limited by the specific determination method of the data division rule.

Based on actual needs, the data division rule may be, for example, cutting tool-based division, process mode-based division, and machining process-based division. The embodiments of the present disclosure are not limited by the specific content of the data division rule.

In addition, the target data set generation module 342 is configured to perform the process of step S1052 in FIG. 2 which includes performing data division on the original data set based on the data division rule to obtain the target data set.

The data division intends to characterize the operation of grouping or dividing the data in the target data set. Specifically, for example, multiple data in the target data set may be divided into a same group, or the data in the data set may be intercepted and divided first, and then the intercepted data may be grouped. The embodiments of the present disclosure are not limited by the specific execution manner of the data division process.

It should be understood that, based on actual needs, for example, only one target data set may be generated, or multiple target data sets may be generated (for example, corresponding to multiple different technical processes or machine tool parts). The embodiments of the present disclosure are not limited by the specific number of target data sets obtained.

Based on the above, the data division rule is determined based on the target operating condition data in the original data set, and the data in the data set is divided. Based on actual needs and specific evaluation objects, the data set associated with the current specific evaluation objects (such as the specific process of the target component, the specific subcomponent of the target component, etc.) can be obtained, so as to obtain the minimum granularity required for subsequent evaluation. The data set is conducive to improving the speed and efficiency of subsequent processing and evaluation; at the same time, based on the data division, the extracted multi-source data is organically combined based on preset rules to obtain the multi-level, multi-dimension status data corresponding to the specific evaluation object. This is conducive to the subsequent accurate and dynamic evaluation of the specific evaluation object based on the data, so as to realize the reliable and high-precision evaluation of the machine tool.

In some embodiments, the machine tool evaluation system can communicate with other systems, receive data from the other systems, and/or send data and evaluation results to the other systems. The machine tool evaluation system can also execute the machine tool evaluation method described above, and realize the corresponding functions described above.

According to another aspect of the present invention, a non-volatile computer-readable storage medium is also provided with computer-readable instructions stored thereon. Upon executed by a computer, the instructions cause the aforementioned method to be executed and achieve the functions as mentioned before.

The program part in the technology can be regarded as a "product" or "article" in the form of executable code and/or related data, which is participated in or realized by a computer-readable medium. Tangible and permanent storage media may include any memory or storage used by computers, processors, or similar devices or related modules. For example, various semiconductor memories, tape drives, disk drives, or any similar device that can provide storage functions for software.

All software or part of it may sometimes communicate via a network, such as the Internet or other communication networks. This type of communication can load software from one computer device or a processor to another, for example, loading the software from one server or a host computer of a machine tool evaluation device to a hardware platform of a computer environment, or to a computer environment of other embodiments systems, or a system with similar functions related to providing information required for machine tool evaluation. Therefore, another medium that can transmit software elements can also be used as a physical connection between local devices, such as light waves, electric waves, electromagnetic waves, etc., to achieve propagation through cables, optical cables, or air. The physical media used for carrier waves, such as cables, wireless connections, or optical cables, can also be considered as media carrying software. Unless the usage herein limits the tangible "storage" medium, other terms that refer to the computer or machine "readable medium" all refer to the medium that participates in the process of executing any instructions by the processor.

This specification uses specific words to describe the embodiments of the present application. For example, "first/second embodiment", "one embodiment", and/or "some embodiments" mean a certain feature, structure, or characteristic related to at least one embodiment of the present application. Therefore, it should be emphasized and noted that "an embodiment" or "one embodiment" or "an alternative embodiment" mentioned twice or more in different positions in this specification does not necessarily refer to the same embodiment. In addition, some features, structures, or characteristics in one or more embodiments of the present application can be appropriately combined.

In addition, those skilled in the art can understand that various aspects of this application can be explained and described through a number of patentable categories or situations, including any new and useful process, machine, product, or combination of substances, or a combination of them. Any new and useful improvements. Correspondingly, various aspects of the present application can be completely executed by hardware, can be completely executed by software (including firmware, resident software, microcode, etc.), or can be executed by a combination of hardware and software. The above hardware or software can refer to "data block", "module", "engine", "unit", "component" or "system". In addition, various aspects of this application may be embodied as a computer product located in one or more computer-readable media, and the product includes computer-readable program codes.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the present disclosure and other embodiments are included in the scope of the attached claims. The present disclosure is defined by the claims and their equivalents.

What is claimed is:

1. A machine tool evaluation method using at least one target component of a machine tool, comprising:
    acquiring type information and attribute information of the at least one target component;
    acquiring, based on the acquired type information and attribute information, target operating condition data, target state monitoring data, and target design parameter data corresponding to the target component;
    providing an original data set based on the target operating condition data, the target state monitoring data and the target design parameter data;
    transforming the original data set to obtain a target data set based on a target preprocessing rule matching the type information and the attribute information of the target component;
    extracting features of the target data set to obtain a feature data set based on a target feature extraction rule matching the type information and the attribute information of the target component;
    executing a multi-level evaluation on the target component based on the feature data set of the target component and providing a multi-level evaluation rule matching the type information and the attribute information of the target component, the multi-level evaluation rule being configured to provide an evaluation result of the target component;
    establishing an evaluation result of the machine tool based on evaluation results of the at least one target component; and
    optimizing the machine tool based on the evaluation result of the machine tool.

2. The machine tool evaluation method of claim 1, wherein for each target component, generating the original data set based on the target operating condition data, target state monitoring data and target design parameter data comprises:
    processing synchronously on the target operating condition data, the target state monitoring data, and the target design parameter data in multiple dimensions to obtain the original data set, wherein the multiple dimensions comprise a spatial dimension and a temporal dimension.

3. The machine tool evaluation method of claim 1, wherein for the each target component, preprocessing the original data set to obtain a target data set based on the target preprocessing rule comprises:
    determining a data division rule corresponding to the original data set based on the target operating condition data in the original data set; and
    performing data division on the original data set to obtain the target data set based on the data division rule.

4. The machine tool evaluation method of claim 1, wherein for each target component, performing feature extraction on the target data set to obtain the feature data set based on the target feature extraction rule comprises:
    extracting features of the target operating condition data in the target data set to obtain operating condition features of the target data set;
    extracting features of the target state monitoring data in the target data set to obtain state monitoring features of the target data set;
    extracting features of the target design parameter data in the target data set to obtain design parameter features of the target data set; and
    obtaining the feature data set of the target component based on the operating condition features, the state monitoring features, and the design parameter features.

5. The machine tool evaluation method of claim 4, wherein obtaining the feature data set of the target component based on the operating condition features, the state monitoring features, and the design parameter features comprises:
    obtaining fusion feature data by performing feature fusion processing based on the operating condition features, the state monitoring features, and the design parameter features, and generating the feature data set based on the fusion feature data.

6. The machine tool evaluation method of claim 1, wherein for each target component, performing the multi-level evaluation on the target component based on the multi-level evaluation rule and the feature data set of the target component and generating the evaluation result of the target component comprises:
    performing, based on the feature data set of the target component, the multi-level evaluation on the target component in terms of the operating condition, monitoring status, and design parameters to obtain evaluation data; and
    generating overall evaluation data of the target component based on the evaluation data.

7. The machine tool evaluation method of claim 1, wherein the target component comprises a cutting tool of the machine tool, wherein
    a step of obtaining the target data set of the cutting tool comprises: dividing the original data set based on machining processes of the cutting tool to obtain at least one sub-data set corresponding to at least one machining process;
    a step of obtaining the feature data set of the cutting tool comprises: extracting data features of data in the at least one sub-data set, wherein the data features comprise at least one of a cosine similarity trend, an average feature trend, or a peak feature trend; and
    a step of generating the evaluation result of the cutting tool comprises: evaluating the cutting tool based on the data features of the data in the at least one sub-data set to obtain process evaluation results of the cutting tool in at least one sub-process and generating the evaluation result of the cutting tool based on the process evaluation results.

8. A machine tool evaluation system implemented by one or more processors, comprising:

a target component acquisition module, configured to acquire type information and attribute information of at least one target component of a machine tool;

a target data determination module provides, for each target component, target operating condition data, target state monitoring data, and target design parameter data corresponding to the target component based on the type information and the attribute information of the target component;

a data collection module, configured to, for each target component, acquire target operating condition data, target state monitoring data, and target design parameter data corresponding to the target component, the data collection module being configured to provide an original data set based on the target operating condition data, the target state monitoring data and the target design parameter data;

a preprocessing module provides, for each target component, a target preprocessing rule corresponding to the target component based on the type information and the attribute information of the target component, the preprocessing module transforming the original data set into to a target data set based on the target preprocessing rule;

a feature extraction module provides, for each target component, determine a target feature extraction rule corresponding to the target component based on the type information and the attribute information of the target component, and extract features from the target data set to obtain a feature data set based on the target feature extraction rule;

a component analysis evaluation module provides, a multi-level evaluation rule corresponding to the target component based on the type information and the attribute information of the target component, the component analysis evaluation module using the multi-level evaluation rule and the feature data set of the target component to establish a multi level evaluation of the target component, the multi level evaluation providing an evaluation result of the target component;

an evaluation result generation module provides, an evaluation result of the machine tool based on the evaluation results of each target component; and an optimization module optimizes the machine tool based on the evaluation result of the machine tool.

9. A non-transitory computer-readable storage medium comprising:

computer-readable instructions stored within the medium which, when executed by a computer, performs a series of functions that evaluate a machine tool based on at least one target component of the machine tool, the series of functions include, type information and attribute information of the at least one target component being acquired;

based on the acquired type information and attribute information, target operating condition data, target state monitoring data, and target design parameter data corresponding to the target component being acquired;

an original data set being provided based on the target operating condition data, the target state monitoring data and the target design parameter data;

the original data set being transformed to obtain a target data set based on a target preprocessing rule matching the type information and the attribute information of the target component;

features being extracted from the target data set to obtain a feature data set based on a target feature extraction rule matching the type information and the attribute information of the target component;

a multi-level evaluation being extracted from the target component based on the feature data set of the target component and a multi-level evaluation rule matching the type information and the attribute information of the target component, and the multi-level evaluation rule providing an evaluation result of the target component;

an evaluation result of the machine tool being established generated based on evaluation results of the at least one target component; and optimizing the machine tool based on the evaluation result of the machine tool.

* * * * *